United States Patent
Chun et al.

(10) Patent No.: US 8,489,103 B2
(45) Date of Patent: Jul. 16, 2013

(54) METHOD AND APPARATUS FOR RECONFIGURING A COMMON CHANNEL

(75) Inventors: Sung Duck Chun, Gyeonggi-do (KR); Young Dae Lee, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 973 days.

(21) Appl. No.: 11/909,257

(22) PCT Filed: Mar. 28, 2006

(86) PCT No.: PCT/KR2006/001126
§ 371 (c)(1),
(2), (4) Date: May 14, 2010

(87) PCT Pub. No.: WO2006/104335
PCT Pub. Date: Oct. 5, 2006

(65) Prior Publication Data
US 2010/0234032 A1    Sep. 16, 2010

(30) Foreign Application Priority Data

Mar. 28, 2005  (KR) .................. 10-2005-0025643

(51) Int. Cl.
*H04W 72/00* (2009.01)
*H04W 88/02* (2009.01)
(52) U.S. Cl.
USPC ................ 455/450; 455/550.1; 455/68
(58) Field of Classification Search
USPC ............. 455/418–420, 422.1, 432.1–435.3, 455/450–452.2, 550.1, 68; 370/329–337, 370/341–345, 312, 431
See application file for complete search history.

(56) References Cited

U.S. PATENT DOCUMENTS

| | | | |
|---|---|---|---|
| 8,144,735 B2 * | 3/2012 | Vayanos et al. | 370/522 |
| 2003/0103478 A1 | 6/2003 | Eriksson | |
| 2003/0232624 A1 * | 12/2003 | Toskala et al. | 455/509 |
| 2005/0068919 A1 * | 3/2005 | Pedlar et al. | 370/329 |
| 2005/0207374 A1 * | 9/2005 | Petrovic et al. | 370/331 |

FOREIGN PATENT DOCUMENTS

| | | |
|---|---|---|
| EP | 1565026 A2 | 8/2005 |
| RU | 2233037 C2 | 7/2004 |
| WO | 01/61884 | 8/2001 |
| WO | 02/067617 | 8/2002 |
| WO | 2004017541 A1 | 2/2004 |
| WO | 2004017580 A1 | 2/2004 |
| WO | 2004064342 A1 | 7/2004 |
| WO | 2004/102836 | 11/2004 |

(Continued)

OTHER PUBLICATIONS

Vogiatzis, N. Sanchez, et al. "An Adaptive Multicarrier wireless access sytem", Wireless Communications and Networking Conference, Sep. 2000. WCNC. 2000 IEEE.

(Continued)

*Primary Examiner* — Kashif Siddiqui
(74) *Attorney, Agent, or Firm* — Lee, Hong, Degerman, Kang & Waimey (57) ABSTRACT

The present invention for reconfiguring a common channel, receives a first control message indicating modification of a first common channel configuration through the first common channel, and a second control message through a second common channel, based on the first control message. The first channel is reconfigured using the second control message. Also, the mobile terminal of the present invention comprises a processor unit by which the common channel is reconfigured. According to the present invention, the common channel, such as the MCCH, may be reconfigured more efficiently.

13 Claims, 8 Drawing Sheets

FOREIGN PATENT DOCUMENTS

| | | |
|---|---|---|
| WO | 2005018116 | 2/2005 |
| WO | 2005/079105 | 8/2005 |

OTHER PUBLICATIONS

European Telecommunications Standards Institute (ETSI); "3rd Generation Partnership Project; Technical Specification Group Radio Access Network; Introduction of the Multimedia Broadcast Multicast Service (MBMS) in the Radio Access Network (RAN); Stage 2 (Release 6)"; Doc. No. 3GPP TS 25.346 V63.0; Dec. 20, 2004.

* cited by examiner

METHOD AND APPARATUS FOR RECONFIGURING A COMMON CHANNEL

CROSS-REFERENCE TO RELATED APPLICATIONS

This application is the National Stage filing under 35 U.S.C. 371 of International Application No. PCT/KR2006/001126, filed on Mar. 28, 2006, which claims the benefit of earlier filing date and right of priority to Korean Application No. 10-2005-0025643, filed on Mar. 28, 2005.

TECHNICAL FIELD

The present invention relates generally to a mobile communication system and, more particularly, to reconfigure a common channel for a mobile communication.

BACKGROUND ART

Figure 1:
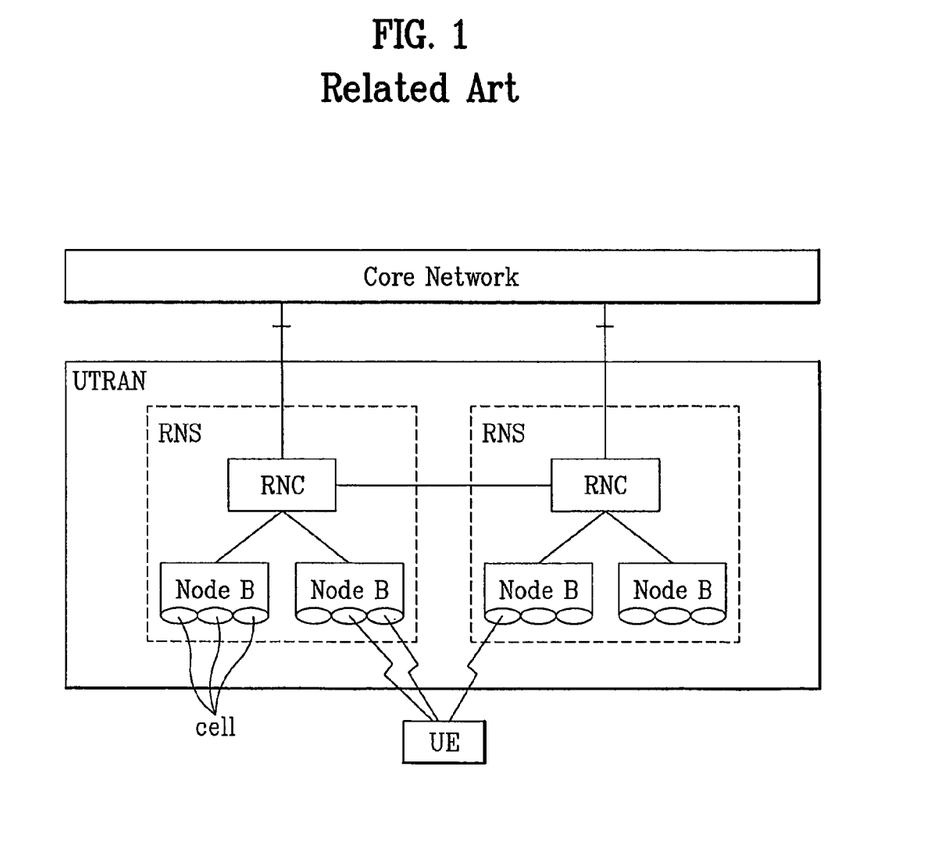
FIG. 1 is a diagram illustrating a network structure of a universal mobile telecommunication system (UMTS).

FIG. 1 is a diagram illustrating a network structure of a universal mobile telecommunication system (UMTS). Generally, a UMTS system 10 comprises a user equipment (UE) 11, a UMTS terrestrial radio access network (UTRAN) 12, and a core network (CN) 13. Herein, the UE may be a mobile terminal in general. The UTRAN 12 comprises at least one of radio network sub-systems (RNSs) 13, and each RNS comprises a radio network controller (RNC) 131 and at least one of Node B 132 which is controlled by the RNC. The Node B includes at least one cell 133.

Figure 2:
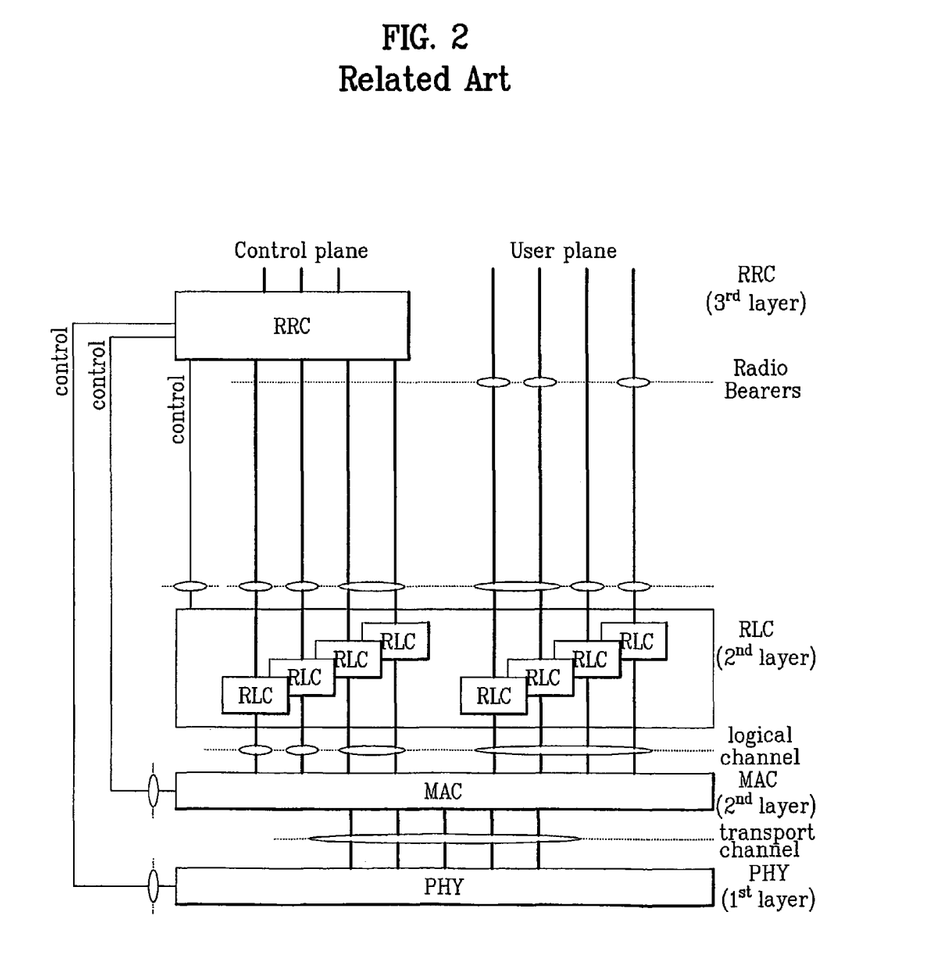
FIG. 2 is a diagram illustrating a layer structure of radio interface protocol between a UE and a UTRAN.

FIG. 2 is a diagram illustrating a layer structure of radio interface protocol in mobile communication system. As shown in FIG. 2, the radio interface protocol comprises horizontally a physical layer, a data link layer and a network layer. Meanwhile, the radio interface protocol comprises vertically a user plane for transmitting user data and a control plane for signaling.

The protocol layers of FIG. 2 comprises L1 (the first layer), L2 (the second layer) and L3 (the third layer). The layers of FIG. 2 correspond to 3 layers from the bottom according to the open system interconnection (OSI) layer structure.

The first layer, i.e., the physical (PHY) layer, provides the higher layer with information transfer service through physical channels. The PHY layer is connected to the second layer, i.e., medium access control (MAC) layer, with transport channels and data is transferred between MAC layer and PHY layer through the transport channels. Meanwhile, data is transferred between the PHY layers of a transmitting side and the PHY layer of a receiving side through the PHY channels.

The MAC layer provides a radio link control (RLC) layer with service through logical channels. The RLC layer of L2 supports reliable data transmission and may segment and concatenate service data units (SDUs) transferred from a higher layer.

A radio resource control (RRC) layer located at the bottom of L3 in the protocol layers is defined on the control plane, may control the logical channels, the transport channels and the physical channels in relation to configuration, reconfiguration and release of radio bearers (RBs). Herein, the RB means a service supported by L2 for data transmission between UE and UTRAN. Generally, to set up a RB means a process for defining a protocol layers and channels for providing a specific service, as well as a process for configuring parameters and operation, corresponding to the specific service.

Moreover, the RRC layer may broadcast system information through a broad control channel (BCCH). The system information regarding a cell is broadcasted to UEs using at least one of system information block (SIB). If the system information is modified, the UTRAN transmits BCCH modification information to the UEs through a paging channel (PCH) or a forward access channel (FACH), for the UEs to have the latest system information.

As an example of point-to-multipoint service, multimedia broadcast/multicast service (MBMS) is explained as follows. The MBMS supplies a streaming or background service using a MBMS bearer which is set up generally for downlink transmission. A MBMS service comprises at least one session, MBMS data is transmitted to UEs using the MBMS bearer during ongoing session. If the UE is activated corresponding to a service to which the UE have been subscribed, the UE may receive the service.

Figure 3:
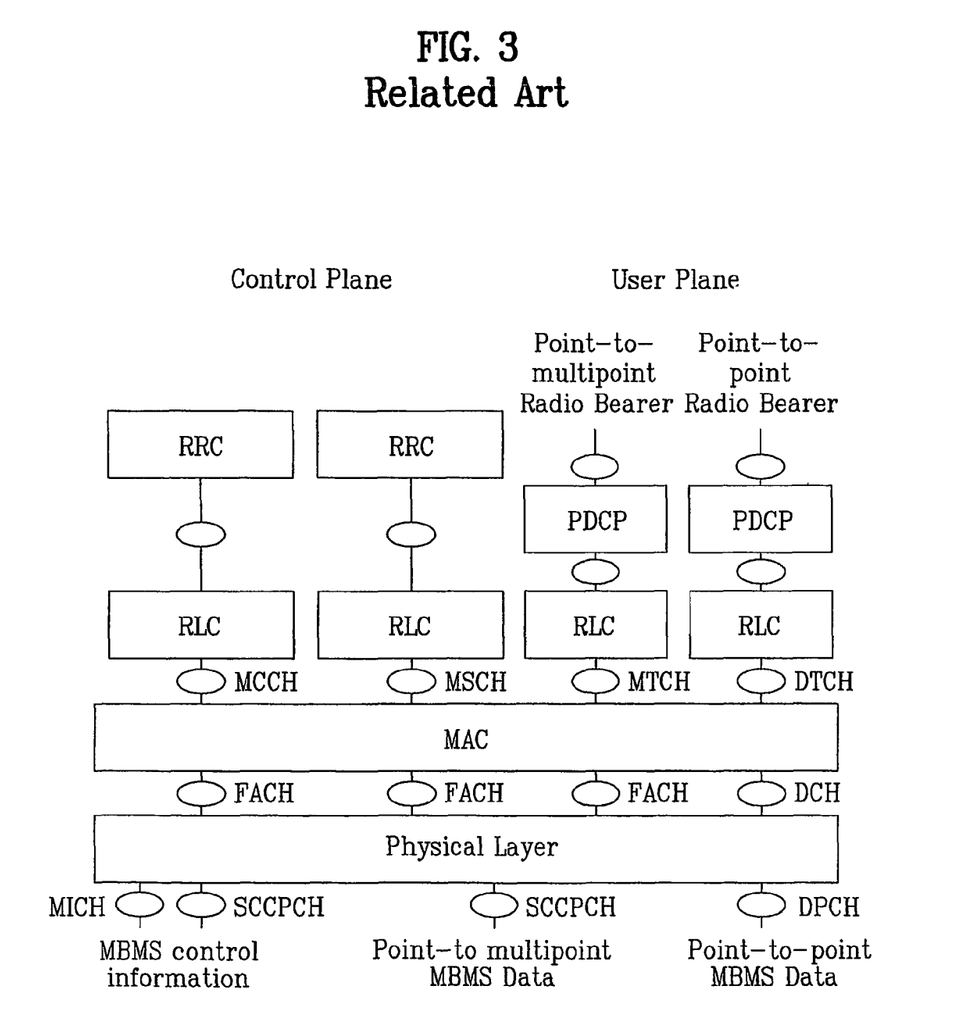
FIG. 3 is a diagram illustrating channels for MBMS.

FIG. 3 is a diagram illustrating channels for MBMS. The UTRAN provides UEs with MBMS using a RB. The UTRAN may set up two types of RBs, i.e., a point-to-point RB and a point-to-multipoint RB. Herein, the point-to-point RB corresponds to a bi-directional RB. The point-to-point RB employs a dedicated traffic channel (DTCH) as a logical channel, a dedicated channel (DCH) as a transport channel, and a dedicated physical channel (DPCH) or a secondary common control physical channel (SCCPCH) as a physical channel.

Meanwhile, the point-to-multipoint RB corresponds to a uni-directional RB. As shown in FIG. 3, the point-to-multipoint RB may employ the MBMS traffic channel (MTCH) as a logical channel, the FACH as a transport channel, and the SCCPCH as a physical channel. The MTCH is configured for each MBMS provided in a cell, is used for transmission of user data corresponding to a MBMS on the user plane. A MBMS control channel (MCCH) which is a logical channel is mapped to the FACH, and the transport channel FACH is mapped to the SCCPCH. In general, one MCCH is allocated to one cell.

Figure 4:
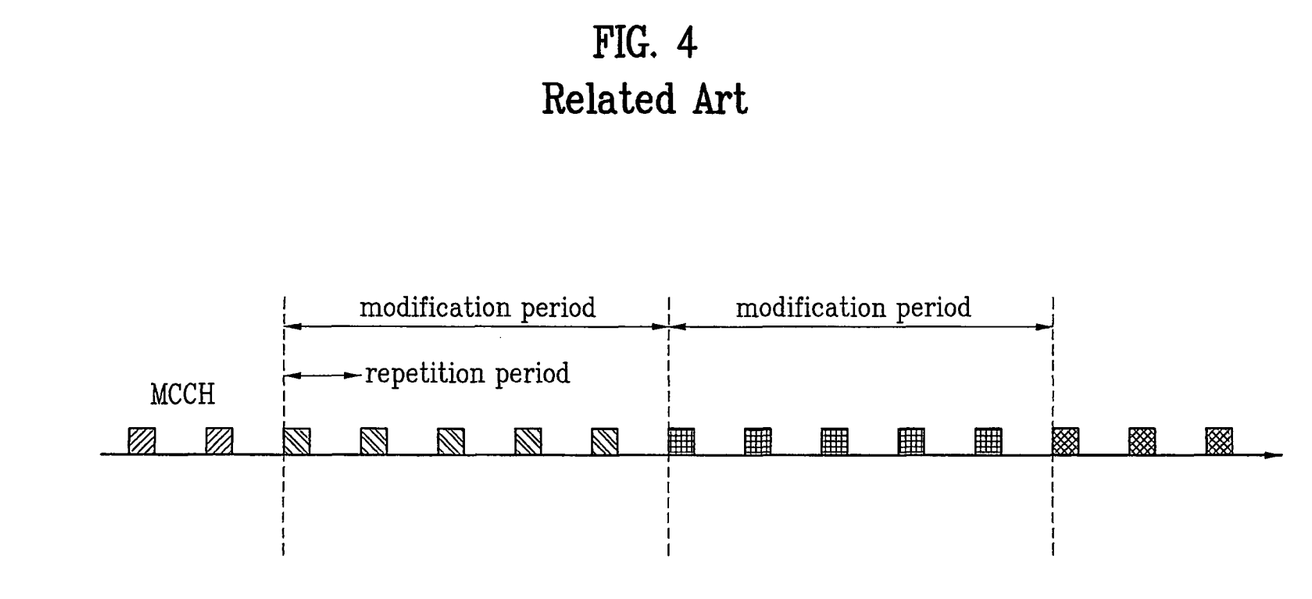
FIG. 4 is a diagram illustrating a method for transmitting MCCH information through the MCCH.

FIG. 4 is a diagram illustrating a method for transmitting MCCH information through the MCCH. As illustrated in FIG. 4, the MCCH information is transmitted through MCCH with two types of periods, i.e., modification period and repetition period. The MCCH information comprises critical information and non-critical information. The non-critical information may be modified in the modification period or in the repetition period. But, the critical information may be modified in the modification period. That is, the critical information is transmitted (repeatedly) during the modification period, and modified critical information is transmitted at the start time of the modification period. The MCCH information means a control message regarding MBMS, and the control message may be a RRC message. The MCCH information includes modified service information (MSI), unmodified service information (USI), point-to-multipoint RB information and access information. Herein, the access information message corresponds to the non-critical information, and the other information message corresponds to the critical information. The access information is transmitted per an access period which is equal to or less than the repetition period. Further, the repetition period may comprise multiple of the access period.

If the UTRAN transmits a control message corresponding to a MBMS, the control message includes a MBMS transmission identity. Herein, the MBMS transmission identity comprises a MBMS session identity and a MBMS service identity. For example, when the UTRAN transmits the MBMS MSI message, the MBMS MSI message includes the MBMS transmission identity and service information corresponding to the MBMS transmission identity.

The UTRAN periodically transmits information regarding whether the MCCH information is modified, thorough a MBMS notification Indicator channel (MICH). Therefore, if a UE wants to receive a specific MBMS data but a session of the specific MBMS doesn't start yet, the UE receives information through a MICH instead of a MCCH or a MTCH.

The UTRAN may modify the MCCH information by generating, adding, changing or deleting parameters from the MCCH information. The UTRAN transmits a MICH message and a MSI message to notify the UE of whether the MCCH information is going to be modified during the modification period. The MSI message includes at least one service identity corresponding to each service modified in the modification period, and information for operating the UE subscribed to the service. Herein, the service identity may be a MBMS transmission identity. The MBMS transmission identity may comprise a MBMS service identity identifying a service. Also, the MBMS transmission identity may comprise combination of a MBMS session identity and a MBMS service identity, the MBMS session identity identifies a service session. A service identity corresponding to a service not being modified during the modification period, among the services currently provided in a cell, is transmitted using a USI message. Herein, the service identity may be a MBMS transmission identity corresponding to the service.

When a service session of a MBMS starts, the UTRAN transmits, through the MICH, a notification indicator (NI) notifying UEs of receiving information through the MCCH. If a UE receives the NI from the UTRAN, the UE is trying to receive the MBMS data. If a UE receives a NI notifying the service modification through the MICH, the UE receives the MCCH information during the modification period indicated by the NI. During receiving the MCCH information, the UE receives the MSI message, and checks whether the MBMS is modified. If the UE detects modification of the MBMS, the UE receives modified MCCH information. Meanwhile, the UE receives the MSI and the USI messages which are transmitted during the modification period, and may acquire a service list listing all services currently provided in the cell in the modification period.

A UE trying to receive a MBMS service using a point-to-multipoint RB receives MCCH information including RB information through a MCCH, and sets up the point-to-multipoint RB in itself using the MCCH information. After setting up the point-to-multipoint RB, the UE receives MBMS data through the physical channel SCCPCH to which the logical channel MTCH is mapped.

The UTRAN may transmit the MBMS data through the MTCH. Herein, as illustrated FIG. 3, the UTRAN transmits a scheduling message to the UE through a MBMS scheduling channel (MSCH) corresponding to the SCCPCH to which the MTCH is mapped. The scheduling message includes information regarding a start point and an ending point of MBMS data transmission in a scheduling period. Therefore, the UTRAN informs the UE of a transmission period of scheduling information (scheduling period) in advance.

According to the related art, MCCH information is transmitted to UEs using the SIB through the BCCH. Therefore, if the MCCH is reconfigured, the UE receives BCCH modification information through the FACH or the PCH, and receives the SIB according to the BCCH modification information. Accordingly, the UE may acquire the MCCH reconfiguration information from the SIB. But, this process for acquiring the MCCH reconfiguration causes some problem. That is, in such case that the UE receives the BCCH reconfiguration information through the PCH, the reconfiguration of the MCCH may be delayed, because a discontinuous reception cycle (DTX cycle), i.e., a transmission period of the PCH, is longer than the MCCH modification period.

DISCLOSURE OF THE INVENTION

Accordingly, the present invention is directed to a channel reconfiguration method that substantially obviates one or more problems due to limitations and disadvantages of the related art.

An object of the present invention is to reconfigure promptly a control channel for more efficient point-to-multipoint service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of reconfiguring a common channel in a communication system comprises receiving a first control message indicating modification of a first common channel configuration through the first common channel. The method also comprises receiving a second control message through a second common channel, based on the first control message. The method also comprises reconfiguring the first common channel, using the second control message.

Preferably, the first common channel is the MCCH, and the second common channel is the BCCH. Preferably, the first control message is a MSI message, and the second control message comprises a SIB.

In another aspect of the present invention, a mobile terminal of the present invention comprises an antenna unit for receiving signals corresponding to a first control message and a second control message, a radio frequency module for processing the received signals at radio frequency, and a processor unit for receiving a first control message indicating modification of a first common channel configuration through the first common channel, receiving a second control message through a second common channel, based on the first control message, and reconfiguring the first common channel, using the second control message.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 5:
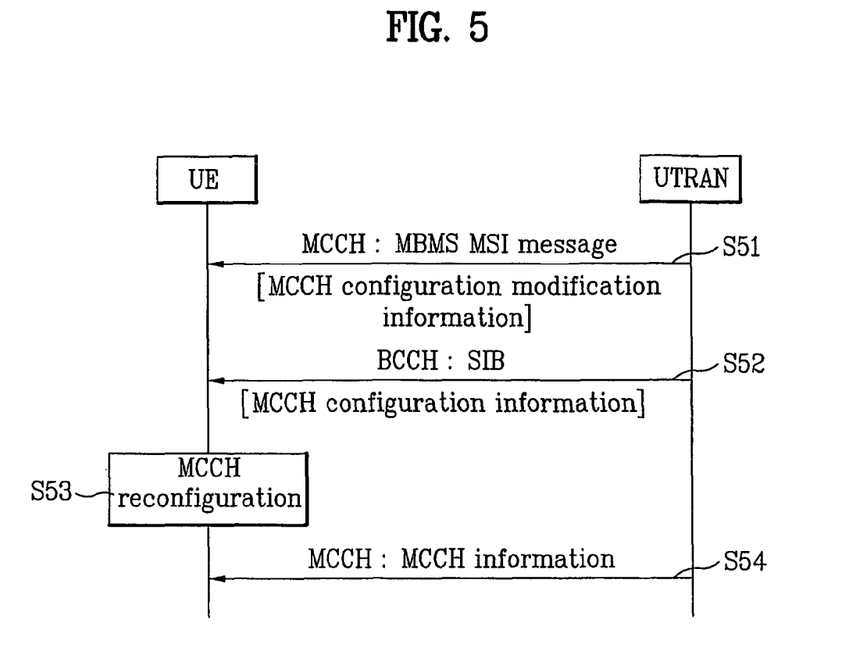
FIG. 5 is a flow chart illustrating a process for reconfiguring a common channel according to the first information.

FIG. 5 is a flow chart illustrating a process for reconfiguring a common channel according to the first embodiment. In the FIG. 5, the MCCH is taken as an example of a common channel, but the method of FIG. 5. is applicable to other common channels.

As illustrated in FIG. 5, a UTRAN transmits MCCH configuration modification information to a UE, during a modification period or a repetition period, through the MCCH S51. Herein, the MCCH configuration modification information may be transmitted repeatedly per a modification period. The MCCH configuration modification information includes information related to modification of the MICH configuration, wherein the MCCH configuration modification information may be transmitted using SIB through BCCH.

The MCCH configuration modification information may indicate the SIB which the UE is to receive, and also include information notifying the modification of a SIB. The UE may monitors MSI message, and if the UE detect the MCCH configuration modification information by the MSI message, the UE tries to receive a SIB through the BCCH, according to the MCCH configuration modification information.

The UTRAN broadcasts MCCH configuration information using a SIB which is transmitted through the BCCH S52. Herein, the MCCH configuration information includes parameters for reconfiguration of the MCCH. Further, the parameters may include at least one of a length of MCCH modification period for reconfiguration, a length of a MCCH repetition period, a length of an access period, a channelization code (for example, OVSF code or scrambling code) of the SCCPCH to which the MCCH is mapped, a spreading factor of a physical channel to which the MCCH is mapped, or size of data block for MCCH transmission.

Also, the parameters may comprise a start time of the MCCH reconfiguration. Herein, the start time may be represented as at least one of a SFN, a CFN, a modification period index, a repetition period index, and an access period index. Unless the MCCH configuration information includes the start time, the UE may determine the start time using the MCCH configuration modification information or a reference time. Wherein, the reference time corresponds to at least one of the SFN, the CFN, the start time of the next modification period, a repetition period or an access period. But, if the MCCH configuration information includes the start time of the MCCH reconfiguration, the UE may recognize the MCCH reconfiguration time. Meanwhile, the start time of the MCCH reconfiguration may be transmitted through the MCCH instead of the BCCH, or be transmitted by the MCCH configuration modification information.

The UE receives the MCCH configuration information, and reconfigure the MCCH according to the parameters S53. The UE receives MCCH information through the MCCH after the reconfiguration of MCCH S54.

Figure 6:
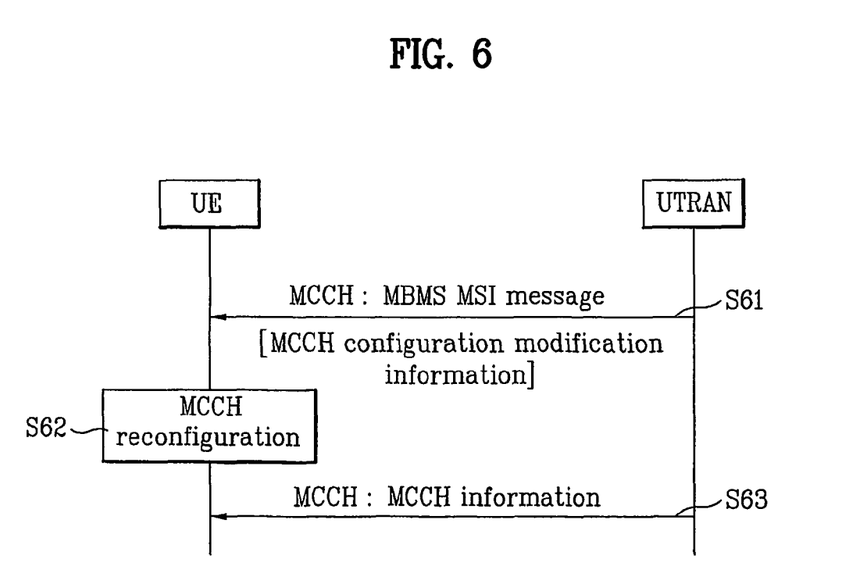
FIG. 6 is a flow chart illustrating a process for reconfiguring a common channel, according to the second embodiment.

FIG. 6 is a flow chart illustrating a process for reconfiguring a common channel, according to the second embodiment. In the FIG. 6, the MCCH is taken as an example of a common channel, but the method of FIG. 6. is applicable to other common channels.

As illustrated in FIG. 6, a UTRAN transmits MCCH configuration modification information to a UE, during a modification period or a repetition period, through the MCCH S61. Herein, the MCCH configuration modification information may be transmitted repeatedly per a modification period.

The MCCH configuration modification information is transmitted using the MSI through the MCCH, and the information includes all or part of parameters which are transmitted using a SIB through the BCCH. Herein, the parameters may include at least one of a length of MCCH modification period for reconfiguration, a length of a MCCH repetition period, a length of an access period, a channelization code (for example, OVSF code or scrambling code) of the SCCPCH to which the MCCH is mapped, a spreading factor (SF) of a physical channel to which the MCCH is mapped, or size of data block for MCCH transmission.

Also, the parameters may comprise a start time of the MCCH reconfiguration. Herein, the start time may be detected by at least one of a SFN, a CFN, a modification period index, a repetition period index, and an access period index. The UE monitors periodically the MSI message, receives the MCCH configuration modification information during a modification period. Unless the MCCH configuration information include the start time, the UE may determine the start time using at least one of the SFN, the CFN, the start time of the next modification period, a repetition period or an access period. But, if the MCCH configuration information includes the start time of the MCCH reconfiguration, the UE may recognize the time of the MCCH reconfiguration. Meanwhile, the start time of the MCCH reconfiguration may be transmitted through the MCCH instead of the BCCH, or be transmitted by the MCCH configuration modification information.

The UE receives the MCCH configuration information, and reconfigure the MCCH according to the parameters S62. The UE receives MCCH information through the MCCH after the reconfiguration of the MCCH S63.

Figure 7:
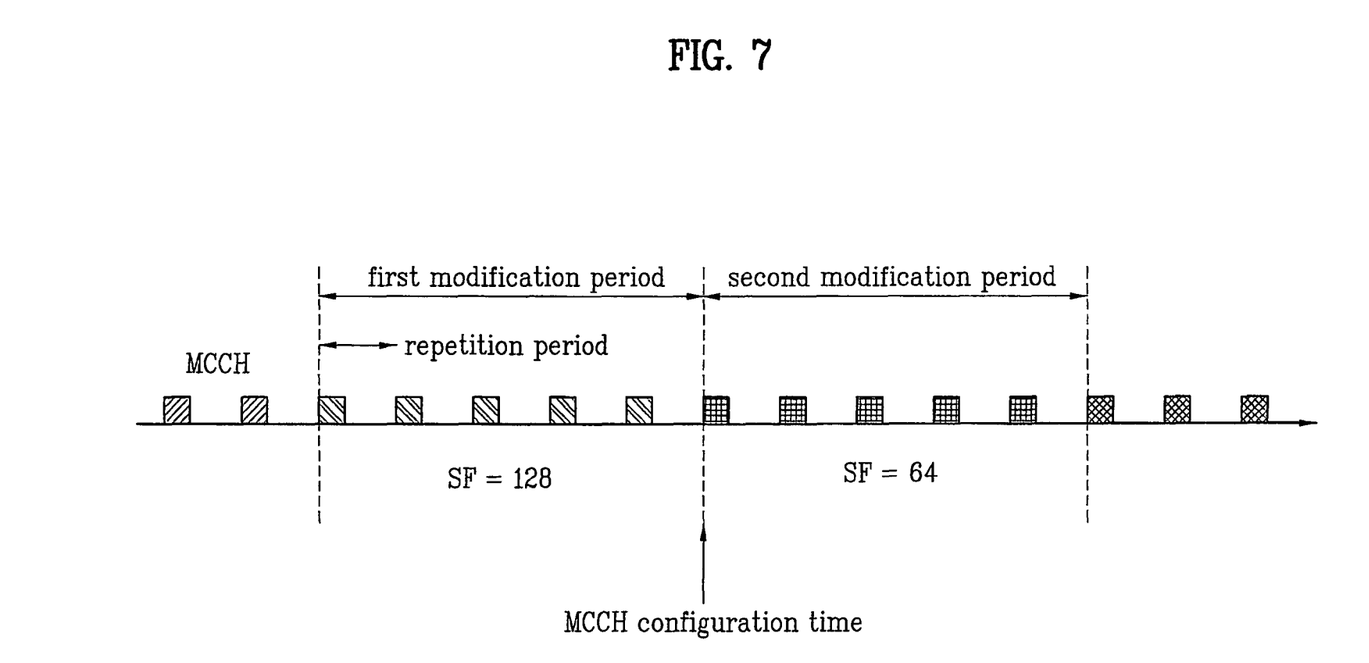
FIG. 7 is a diagram illustrating when the MCCH is reconfigured.

FIG. 7 is a diagram illustrating the MCCH reconfiguration time. As shown in FIG. 6, the reconfiguration of MCCH is performed at the end of the first period in which the MCCH configuration information is received, wherein the end of the first period corresponds to the start time of the second period. For example of the MCCH reconfiguration, supposed that SF of the SCCPCH to which the MCCH is mapped is changed from 128 to 64, the UTRAN transmits the MCCH configuration modification information, and then transmits the MCCH configuration information. Thus, the UE may receive the MCCH configuration information during the first period, and reconfigure the MCCH at the start time of the second period.

Figure 8:
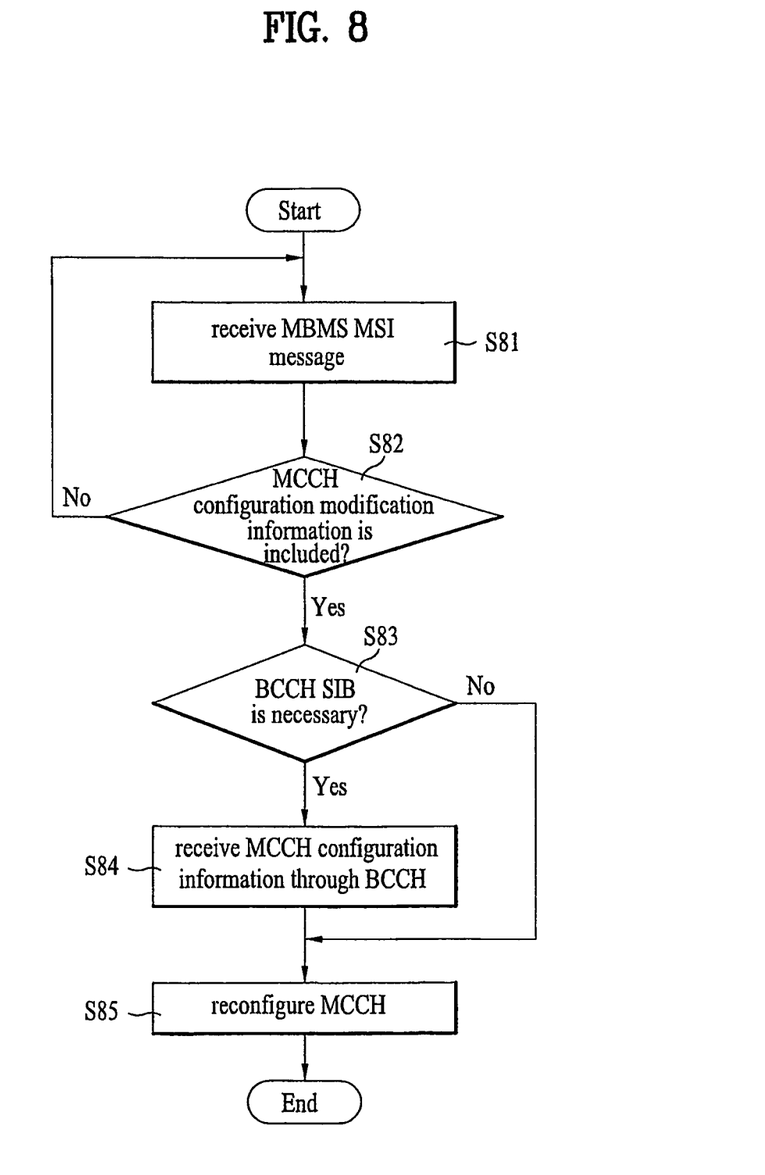
FIG. 8 is a flow chart illustrating MCCH reconfiguration process in a UE.

FIG. 8 is a flow chart illustrating MCCH reconfiguration process in a UE. The UE receives a MSI message in every modification period S81. And, the UE examines whether the MCCH configuration modification information is included in the MSI message S82. If included, the UE determines whether the UE is to receive a SIB through the BCCH based on the MCCH configuration modification information S83. If the UE determines that it is unnecessary to receive the SIB, the UE reconfigures the MCCH using the information included in the MSI message S85.

Meanwhile, if it is necessary for the UE to receive the SIB, the UE receives the SIB through BCCH, according to the MCCH configuration modification information S84. Herein, the MCCH configuration modification information may indicates a specific SIB which the UE is to receive.

The UE reconfigures the MCCH using the MCCH configuration modification information or using the SIB received through the BCCH. If the MCCH configuration modification information or the SIB includes reconfiguration time, the UE reconfigure the MCCH at the time, then the UE receives MCCH information through the reconfigured MCCH S85.

Figure 9:
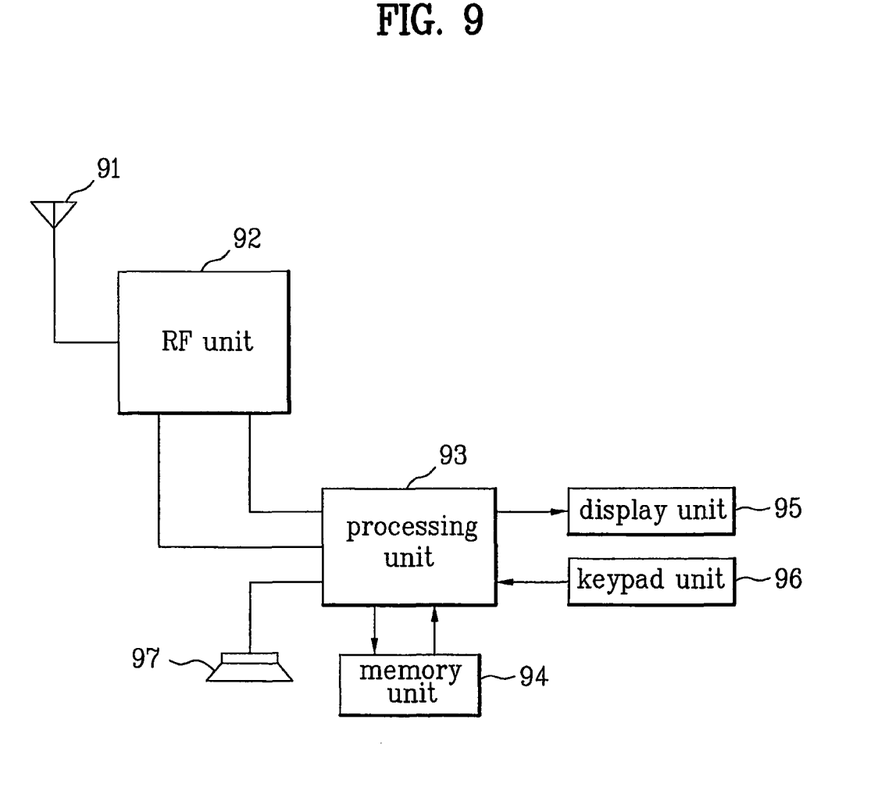
FIG. 9 is a structural diagram illustrating a UE according to the present invention.

FIG. 9 is a structural diagram illustrating a UE according to the present invention. As shown in FIG. 9, the UE comprises an antenna unit 91, a radio frequency (RF) unit 92, a signal processing unit 93 and memory unit 94. The signal processing unit 93 includes a procession unit such as a micro process or a digital signal processor. Further, the UE may also comprise a display unit 95, a key pad unit 96 and speaker unit 97.

The UE receives signals through the MCCH and the BCCH using the antenna unit 91 and the RF unit 92. The signal processing unit 93 reconfigures the MCCH using the signals received through the MCCH and the BCCH according to above-explained process.

The present invention is applicable to a personal digital assistant and a notebook computer capable of mobile communication as well as a mobile phone. Also, the preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Although various embodiments of the present invention have been described with reference to a node-B, the present invention may be applied to a base station or any other type of fixed communication station.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention can be applied to a mobile communication system.

What is claimed is:

1. A method of reconfiguring a common control channel, the method comprising:

receiving a control message through a multimedia broadcast/multicast service control channel (MCCH), the control message indicating modification of an MCCH configuration; and reconfiguring the MCCH using the control message, wherein the control message includes at least one control parameter used for reconfiguring the MCCH, wherein the at least one control parameter includes at least a modification period, a repetition period, an access period, a channelization code, a spreading factor or a size of a data block.

2. The method of claim 1, wherein the control message further includes activation time information for the reconfiguration of the MCCH.

3. The method of claim 2, wherein the activation time information includes at least a system frame number (SFN), a connection frame number (CFN), a start time of a modification period, a start time of a repetition period, or a start time of an access period.

4. The method of claim 2, wherein the MCCH is reconfigured according to the activation time information.

5. The method of claim 1, wherein the control message further includes a modified service information message.

6. The method of claim 1, wherein the control message is received from a network with period.

7. The method of claim 1, wherein the MCCH is reconfigured at a reference time if the control message does not include activation time information.

8. The method of claim 7, wherein the reference time is a start time of a next modification period from the reception of the control message.

9. A method of reconfiguring a common control channel, the method comprising:

transmitting a control message through a multimedia broadcast/multicast service control channel (MCCH), the control message indicating modification of an MCCH configuration to facilitate reconfiguration of the MCCH at a user equipment;

wherein the control message includes at least one control parameter for the reconfiguration of the MCCH, wherein the at least one control parameter includes at least a modification period, a repetition period, an access period, a channelization code, a spreading factor or a size of a data block.

10. A mobile terminal for reconfiguring a common control channel, the mobile terminal comprising:

an antenna unit for receiving signals corresponding to a control message;

a radio frequency module for processing the received signals at radio frequency; and a processor unit for receiving a control message through a multimedia broadcast/multicast service control channel (MCCH), the control message indicating modification of an MCCH configuration, and reconfiguring MCCH using the control message, wherein the control message includes at least one control parameter used for reconfiguring the MCCH, wherein the at least one control parameter includes at least a modification period, a repetition period, an access period, a channelization code, a spreading factor or a size of a data block.

11. The method of claim 9, wherein the control message includes activation time information for the reconfiguration of the MCCH.

12. The method of claim 11, wherein the activation time information includes at least a system frame number (SFN), a connection frame number (CFN), a start time of a modification period, a start time of a repetition period, or a start time of an access period.

13. The method of claim 9, wherein the control message further includes a modified service information message.

* * * * *